United States Patent [19]
Ainvarg

[11] 3,767,950

[45] Oct. 23, 1973

[54] INDUCTOR MACHINE

[76] Inventor: Arkady Semenovich Ainvarg, Ulitsa Turgenevskaya 62, kv. 6, Kiev, U.S.S.R.

[22] Filed: Mar. 10, 1972

[21] Appl. No.: 233,626

[30] Foreign Application Priority Data
Mar. 29, 1971 U.S.S.R............................... 1635160

[52] U.S. Cl................................. 310/168, 310/169
[51] Int. Cl. ............................................ H02k 19/29
[58] Field of Search ..............................310/168–170

[56] References Cited
UNITED STATES PATENTS
| | | | |
|---|---|---|---|
| 3,370,191 | 2/1968 | Koch................................... | 310/168 |
| 2,369,287 | 2/1945 | Dreyfus.............................. | 310/169 |
| 2,431,223 | 11/1947 | Ball..................................... | 310/169 |

*Primary Examiner*—D. F. Duggan
*Attorney*—Holman & Stern

[57] ABSTRACT

An electromechanical converter having electrical reduction, and made in the form of an inductor machine operating on the basis of utilization of tooth harmonics of the magnetic field. The inductor machine consists of a stator having at least one armature winding and a field winding, and a rotor, said stator having N zones, in each of which a relative arrangement of the stator and rotor teeth is identical; the invention is characterized in that said field winding consists of a multicoil winding with p pole pairs, while at least one armature winding is provided with a number of pole pairs equal to (N+p), (N−P). The use of the distributed field winding having the above-mentioned ratio between numbers of teeth permits to obtain substantially sinusoidal output voltage waveform in the generator mode and high uniformity of the rotational speed in the motor mode.

6 Claims, 9 Drawing Figures

PATENTED OCT 23 1973  3,767,950

INDUCTOR MACHINE

BACKGROUND OF THE INVENTION

1. Field of the Invention

The present invention relates to electromechanical invertors with electrical reduction, and, more particularly, to inductor machines operating according to the principle of utilization of tooth harmonics of the magnetic field.

2. Description of Prior Art

There are known inductor machines, i.e., reducing electric motors, having two independent stator windings — an armature winding and a field winding, in which the difference between the numbers of slots in the stator and the rotor, i.e., the number of zones of the stator, in each of which the mutual disposition of the stator and rotor teeth is identical, is equal to the sum of or the difference between the numbers of the pole pairs of the armature winding and the field winding.

These conventional machines are deficient in that they have a low utilization of active materials due to the use of only one of the three components of the magnetic induction, as well as in impossibility of their use under special conditions, such as in the frequency invertor mode, self-excitation mode, and the like. Furthermore, where such motors are supplied from a single-phase source, phase-shift members should be inserted in the supply circuit of the motor, which limits the possibility of their speed control.

Another disadvantage of the above-mentioned machines consists in that the magnetic circuit is made in the form of a circular stator and the rotor laminations composed of plates made of electricalgrade steel. This limits the use of such machines under high frequency conditions due to losses in steel plates whose minimum thickness is selected on the basis of the technological point of view.

In conventional inductor machines having a rod-shaped magnetic circuit comprising separate rod-like laminations, high frequency losses could be reduced by winding said rods using thin-band electricalgrade steel. However, ratios between the numbers of the stator and rotor teeth and the construction of windings in these machines do not permit the control of the rotational speed in the motor mode or voltage frequency in the generator mode by varying the excitation current frequency.

SUMMARY OF THE INVENTION

The invention consists in the provision of an inductor machine which is more versatile as compared to known ones as to possible operating modes, and which, at the same time, exhibits better utilization of active materials and permits to increase the efficiency when operating at high frequencies.

This object is accomplished by that in an inductor machine, comprising a stator having open teeth and at least one armature winding and a field winding, and a rotor having teeth and windings, the open teeth of the stator and the rotor defining N zones on the stator, the relative arrangement of the stator and rotor teeth being identical in these zones; according to the invention, said field winding is made as a polyphase winding with $p$ poles pairs, while at least one of the armature windings is provided with a number of pole pairs equal to $(N + p)$ or $(N - p)$.

Where the stator has two armature windings, it is advantageous that numbers of pole pairs thereof be equal to $(N + p)$ and $(N - p)$.

It is advantageous that the ratio between the numbers of pole pairs of the field winding and the numbers of pole pairs of the armature windings, and vice versa, as well as the ratio between the numbers of pole pairs of the armature windings be equal to integers.

The magnetic circuit of the machine may comprise axially layered laminations.

In a particular case the number $p$ of the pole pairs of the field winding may be equal to the number $N$ of the stator zones, one of the armature coils being optionally made as an annular coil coaxial with the shaft.

BRIEF DESCRIPTION OF THE DRAWINGS

The subject-matter of the invention will be better understood from the following description of the embodiments of the inductor machine with reference to the accompanying drawings, in which.

Figure 1:
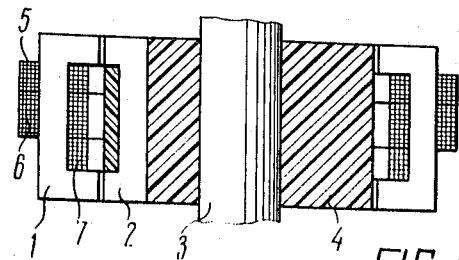
FIG. 1 shows an axial cross-sectional view of the machine having a rod-shaped magnetic circuit with a number "$p$" of pole pairs of the field winding which is equal to a number N of the stator zones in each of which a relative arrangement of the stator and rotor teeth is identical at $p = N = 1$.
Figure 2:
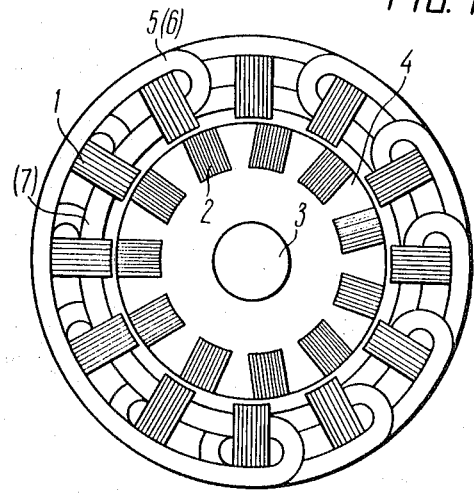
FIG. 2 is an end view of the inductor machine shown in FIG. 1.

As is shown in FIGS. 1 and 2, the magnetic circuit of the machine is composed of U-shaped stator laminations of a stator 1 and laminations of a rotor 2. The laminations are made of electrical-grade steel and are layered along the shaft 3 of the machine. There are 12 laminations on the stator 1 and 11 laminations on the rotor 2. The laminations on the stator 1 and on the rotor 2 are interconnected by an appropriate method ensuring the rigidity of their interrelation. Thus, the laminations of the rotor 2 are conventionally shown as fastened by filling up the spaces therebetween with a filler material 4.

There are no windings on the rotor 2. The stator 1 is provided with three windings: a polyphase field winding 5 and an armature winding 6 made as a conventional type distributed polyphase winding of AC electric machines, and the second armature winding 7 which is a single-phase winding comprising an annular coil having its axis coinciding with that of the machine shaft 3. The field winding 5 has one pole pair ($p = 1$), while the armature winding 6 has two pole pairs ($p = 2$).

Considering the operation of the machine in the generator mode, the field winding 5 is coupled to a symmetric polyphase current source of an angle frequency $\Omega$ (not shown in FIGS. 1 and 2) and creates a rotating magnetising field (further referred to as MF), the value $F_k$ of the fundamental harmonic of said field in each stator lamination K being $$F_k = F_m \cos[\Omega t + (K - 1)(2\pi/Z_1)]$$

wherein $F_m$ is maximum value of MF, $Z_1$ is a number of the stator laminations.

Taking into account the mutual disposition of the stator and rotor laminations, the fundamental harmonic $\lambda_k$ of the magnetic conductance of an air gap under a stator lamination K is $$\lambda_k = \lambda_o \ 1 + \gamma \cos[\omega t + (K - 1)(2\pi/Z_1)$$

wherein $\lambda_o$ and $\gamma$ a constant component and depth of modulation of magnetic conductance respectively; $\omega = 2\pi Z_2 n$ is angle frequency of magnetic conductance variation;

$Z_2$ is number of the rotor laminations;

$n$ is number of revolutions of the rotor per second;

$t$ is time.

A magnetic flux $\phi_k$ of a stator lamination K is
$$\phi_k = F_k \lambda_k = F_m \lambda_o \cos[\omega t + (K - 1)(2\pi/Z_1)] + \\ + (1/2) F_m \lambda_o \gamma \cos[(\omega + \Omega)t + (K - 1)2(2\pi/Z_1)] + \\ + (1/2) F_m \lambda_o \gamma \cos(\omega - \Omega)t$$

and is composed of three components. The second component induces in the armature winding 6 a symmetrical polyphase voltage of a sum frequency ($\omega + \Omega$), while the third component induces in the annular armature winding 7 a single-phase voltage of a differential frequency ($\omega - \Omega$). Upon a change of the direction of relative rotation between MF wave of the excitation and the rotor, a sum frequency will appear in the winding 7, while a differential frequency will appear in the winding 6.

The process of the generation of voltage at sum or differential frequency in a single-phase armature winding 7 is illustrated in FIGS. 3a, 3b, 4a, 4b, 5a and 5b. The field winding is not shown in these figures; further while the MF created by this winding and having opposite polarities at the projections of the stator laminations are conventionally indicated by the letters N and S in longitudinal cross sectional views and as waves $N_1$ and $S_1$ in transverse cross sectional views, the shaded waves $N_1$ and $S_1$ of MF in transverse cross sectional views illustrate the excitation field only at one side of the armature winding 7. The armature winding 7 is shown as a rectangular section conductor disposed between the projections of the stator laminations.

Figure 3B:
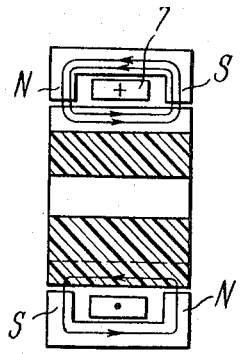
FIG. 3a and 3b diagramatically show longitudinal and transverse cross sectional views of the inductor machine at an instant of maximum flux-linkage between an annular armature winding and the field winding of the machine shown in FIG. 1 and 2, as well as the polarities of macnetic fields created by the field winding at the projections of the stator laminations, and magnetic fluxes of the two laminations.

Magnetic flux attains its maximum value in the stator lamination which is aligned with the axis of the excitation field (the lamination 1' in FIG. 3a), and at that instant, when an area of a relative overlap between the projections of this stator lamination and of the rotor lamination is at its maximum (such an instant is illustrated in FIG. 3b). This maximum flux is illustrated in FIG. 3b by two lines of force. At the same instant the flux in an oppositely disposed lamination 7' of the stator 7 has an opposite direction and is of considerably lower value, since a non-magnetic inter-lamination gap of the rotor is disposed oppositely to the lamination 7'. The flux in the lamination 7' is conventionally shown in FIG. 3b by one line of force. The resulting flux in the rotor, which is equal to the difference between the fluxes of the stator laminations 1' and 7', is of the same direction as the flux of the lamination 1', i.e., the flux is directed from left to right (in longitudinal cross section in FIG. 3b).

Considering similarly other laminations, the resulting magnetic flux of the rotor penetrating a coil of the annular armature winding 7 is equal to a difference between the fluxes of a half of all the laminations disposed in a field of one polarity (laminations 11', 12', 1', 2', 3' in FIG. 3a) and the fluxes of a half of the laminations disposed in a field of the other polarity (laminations 5', 6', 7', 8', 9'). At the instant illustrated in FIG. 3b this resulting flux is directed from left to right in a longitudinal section.

Figure 4B:
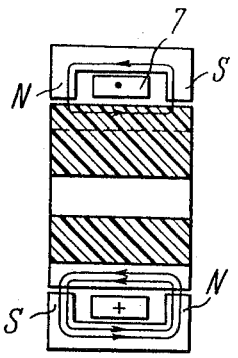
FIG. 4a and 4b show a change of magnetic fluxes after rotation of the rotor through one half of a tooth pitch relative to the rotor as referred to the position of the machine shown in FIG. 3.
Figure 4A:
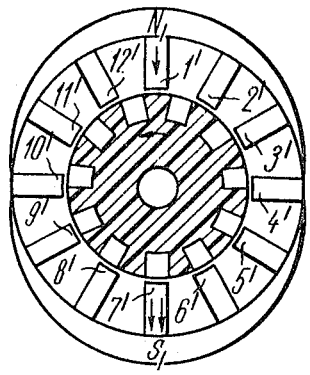

Upon rotation of the rotor through one-half of a tooth pitch thereof the mutual disposition of the stator and rotor laminations becomes that shOwn in FIGS. 4a and 4b. In this position, if the pattern of the excitation field has not been changed, the maximum flux is that of the stator lamination 7' (as well as that of a rotor lamination disposed opposite thereto), while a flux of the lamination 1' is reduced.

The flux pattern will become contrary to that at the instance illustrated in FIG. 3: a sum of the fluxes of the laminations 5' + 9' will be greater than a sum of the fluxes of the laminations 11' + 3', and the resulting flux of the rotor will change its sign.

Thus, a value of a magnetic flux penetrating the annular armature winding 7 (and respectively the EMF induced in the winding) is determined, as in all inductor machines, by a difference between maximum and minimum magnetic conductance of a tooth pitch of the stator (by the tooth pitch is meant a pitch along the laminations), while an angular frequency of EMF in the armature winding is $$\omega = 2\pi Z_2 n$$

Figure 3A:
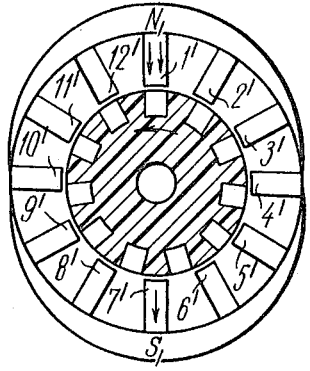
Figure 5B:
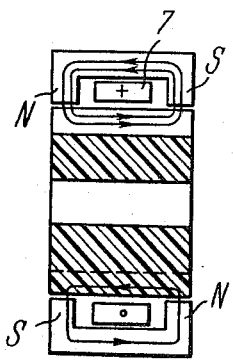
FIG. 5a and 5b show longitudinal and transverse cross-sectional views of magnetic fluxes of said laminations with the rotor in the position shown in FIG. 3, but upon the rotation of the excitation field through an angle corresponding to a stator tooth pitch.
Figure 5A:
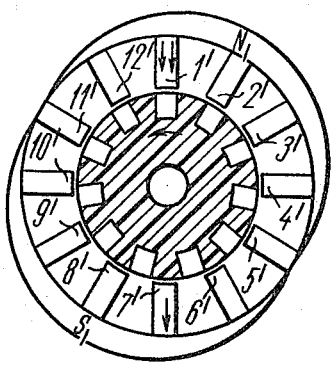

Assuming that the excitation field is rotated at an angular frequency $\Omega$ of the excitation current, FIGS. 5a and 5b show the case, where during rotation of the rotor through one tooth pitch thereof from the position shown in FIGS. 3a, 3b, the excitation field is rotated contrary to the rotor rotation through one tooth pitch of the stator. At the instance illustrated in FIGS. 5a and 5b the fluxes of the laminations 1' and 7' are of the same direction as in FIGS. 3a, 3b but are of a lower value. Therefore, a magnetic flux and EMF in the annular armature winding 7 attain their maximum value somewhat later, namely, at an instant when the maximum overlap area occurs in the lamination 2'. Thus, a period of EMF in the armature winding 7 is no longer equal to a time of rotation of the rotor through a tooth pitch thereof, but is somewhat greater, while a frequency of the EMF is respectively lower. In the same manner, it can be shown that if the excitation fields are rotated in the direction of the rotation of the rotor, a frequency of the induced EMF is increased. Thus, an angular frequency of EMF induced in the armature winding 7 is composed of an angular frequency $\omega_k$ of variation of magnetic conductance of an air gap of the stator tooth pitch and an angular frequency $\Omega$ of the excitation current:

$$\bar{\omega}_k = \omega \pm \Omega$$

wherein the sign "+" corresponds to the rotation of the axis of the excitation field co-directionally with the rotor, while the sign "−" corresponds to the rotation in the direction opposite to the rotor rotation.

This inductor machine functions in the single-phase motor mode as follows. The winding 5 is connected to a polyphase excitation source operating at a frequency $\Omega$. During the starting period, a single-phase voltage at a frequency $\omega_o$ is applied to the polyphase winding 6 through phase shift members (not shown), said winding being preferably made as the two-phase winding, and the rotor is rotated at a speed of $$n = (\omega_o + \Omega/2\pi Z_2) \; r \cdot p \cdot s.$$

Then the supply voltage is switched over to the winding 7, and the running motor begins to operate at a speed of $$n = (\omega_o - \Omega/2\pi Z_2) \; r \cdot p \cdot s.$$

If it is desired to maintain a speed $n = \omega_o + \Omega/2\pi Z_2$ up to which the motor has been accelerated during the starting period, an alternation of the phases of the field winding currents is to be switched over concurrently with the switching over of the supply voltage. Thus, the winding 6 functions as the starting winding.

FIGS. 3a, 3b, 4a, 4b, 5a and 5b illustrate the operation of the machine in the single-phase motor mode, only the annular armature supply winding 7 being shown. The interaction between magnetic field formed by the annular armature supply winding 7 and by the field winding tends to rotate the rotor into such a position (FIGS. 3a, 3b), in which an overlap of the area of the projections of the stator and rotor lamination will be at its maximum along the axis of the excitation field (which corresponds to maximum flux-linkage between the armature winding 7 and the field winding). Upon half-cycle of the supply frequency $\omega_o$, with the position of the excitation field remaining unchanged (in the case of the DC excitation) the position of maximum overlap should be at the opposite pole of the excitation field (FIGS. 3a, 3b) due to a change in the direction of field of the armature winding coil, and the rotor will further rotate through one-half of a tooth pitch thereof to attain this position. Continuing to rotate due to the inertia, the rotor will be again in the position shown in FIGS. 3a, 3b over half-cycle of the frequency $\omega_o$. In operation under a load, this rotation of the rotor will be performed with a delay for a rundown angle of the rotor as is the case in all synchronous machines.

Therefore, the interaction between a stationary magnetic excitation field and an alternating magnetic field of the armature winding results in the creation of an electromagnetic torque to rotate the rotor at a synchronous speed of $$n_o = \omega_o/2\pi Z_2$$

If, on the contrary, the excitation field is rotated at an angular frequency $\Omega$ (FIG. 5), then, taking into account the fact that the rotor always tends to establish maximum flux-linkage between the windings, it can be shown that the rotor speed is of $$n = \omega_o \pm \Omega/2\pi Z_2$$

wherein the sign "+" corresponds to the rotation of the excitation field opposite to the rotor, while the sign "−" corresponds to the rotation co-directional with the rotor.

The above-described principle of the operation of the machine will remain unchanged, if a number $p$ of pole pairs of the field winding and a number N of the stator zones which is equal thereto are other than unity.

In a general case, where both the voltage of the sum frequency $\omega + \Omega$ and the voltage of differential frequency $\omega - \Omega$ induced when operating in the generator mode should be polyphase ones, the machine is made with N is not equal to $p$, that is a number of zones of the stator in which a relative arrangement of the stator and rotor teeth is identical, is not equal to a number of pole pairs of the field winding. A diagrammatical embodiment of such machine is given in FIG. 6. A stator 8 and a rotor 9 are made in the form of conventional circular laminations (shown in a developed view in FIG. 6), which are composed of plates of an electrical grade steel and are provided with open slots. Numbers of slots in the stator and rotor are equal to 24 and 21 respectively, which corresponds to N = 3.

Three polyphase distributed windings are placed in the stator: a field winding 10, which is conventionally shown as the conductors of the intermediate layer disposed in the slots, has one pole pair; armature windings 11 and 12, which are conventionally shown as the conductors of the upper and lower layers, have numbers of pole pairs of $p = 2$ and $p = 4$ respectively.

Figure 6:
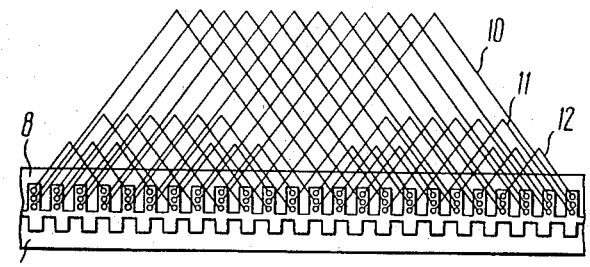
FIG. 6 shows a structural diagram illustrating a developed view of the machine in which a number "$p$" of pole pairs is not equal to a number N of the stator zones, the magnetic circuit being made of laminated circular rotor and stator packs.

This machine operates in the generator mode as follows. With the symbols as adopted above, MF "$F_k$" and magnetic conductivity $\lambda_k$ for a tooth K of the stator of the machine shown in FIG. 6 are:

$$F_k = F_m \cos[\omega t + (K - 1)(2\pi/Z_1)]$$

$$\lambda_k = \lambda_o \; 1 + \gamma\cos[\omega t + (K + 1)3(2\pi/Z_1)]$$

Magnetic flux $F_k$ of the stator tooth K is $$\phi_k = F_k \lambda_k = F_m \lambda_o \cos[\omega t + (K-1)(2\pi/Z_1)] +$$
$$+ (1/2) F_m \lambda_o \cos[(\omega + \Omega)t + (K-1)4(2\pi/Z_1)] +$$
$$+ (1/2) F_m \lambda_o \gamma \cos[(\omega - \Omega)t + (K-1)2(2\pi/Z_1)]$$

and comprises components of different frequencies distributed by teeth with different spacings along the length of the teeth zone. Therefore, a symmetric polyphase voltage of a differential frequency ($\omega - \Omega$) is induced in the winding 11, while in the winding 12 there is induced a symmetric polyphase voltage of a sum frequency ($\omega + \Omega$). Upon a change of direction of relative rotation of the rotor and the MF wave of the excitation a sum frequency voltage will be induced in the winding 11, while a differential frequency voltage is induced in the winding 12.

In the motor mode of operation with the supply of any armature winding from a polyphase source at a frequency $\omega_o$, the rotor rotates at a speed of $$n = \omega_o + \Omega/2\pi Z_2 \text{ or } n = (\omega_o - \Omega/2\pi Z_2) \; r \cdot p \cdot s.$$

depending upon a direction of relative rotation of the rotor and MF wave of the excitation, or, if this direction of relative rotation is determined, depending upon that armature winding which is coupled to the supply voltage. This motor may be also used with the supply voltage being provided from two sources at different frequencies, which gives an opportunity to increase reliability of electric drive in self-contained systems, where one of the sources may fail.

In a general case the stator may have N zones, in each of which a relative arrangement of the stator and rotor teeth is repeated, that is there is N full cycles of variation of magnetic conductance. Then, numbers of pole pairs of the armature windings are equal to (N+ p) and (N − p), wherein p is a number of pole pairs of the field winding. Numbers of pole pairs in all windings are preferably specified to comply with the condition of the absence of transformer coupling therebetween as referred to a constant component of the magnetic conductance. The most advantageous is the selection of a ratio between pole pairs of the windings which is equal to an integer, that is in, such a manner that the ratios $p/N + p, p/N - p$ or $N + p/p, N - p/p$ as well as $N + p/N - p$ or $N - p/N + p$
represent integers.

The magnetic circuit of the machine with $p$ N may be made as shown in FIG. 6, or may have a rod-like shape as shown in FIG. 1 and 2 depending upon frequency, rotational speed, mode of operation and other factors.

If a supply source permits to control a frequency $\Omega$, frequencies of voltages produced in the generator mode or the rotational speed in the motor mode can be controlled with high accuracy.

Besides the use of this machine in the generator and motor modes, it may be operated in other modes. Thus, the machine, in which the field winding having $p$ pole pairs is coupled to a polyphase supply source of an angular frequency $\Omega$, while the armature winding having $N - p$ pole pairs is coupled to a polyphase supply source of an angular frequency $\omega_o$, operates as reducing motor at a rotational speed of $n = \pm (\omega_o \pm \Omega/2\pi Z_2)$ rps. In this case EMF of an angular frequency $\omega_o \pm \Omega$ is induced in the second armature winding having $N + p$ pole pairs. Therefore, the machine operates as a combination commutatorless motor-generator which converts a frequency $\omega_o$ of the supply source into a frequency $\omega_o \pm \Omega$ with simultaneous speed reduction.

Another example of the use of the machine shown in FIG. 1 and 2 is its application as a sensor in a follow-up system with electric reduction in the transformer mode. In this case a single-phase supply voltage is applied to the armature winding 7, while three voltages at the supply frequency are obtained from the polyphase (e.g. three-phase) winding 5 and fed to the coupling line, the amplitudes of these voltages depending upon the position of the rotor and passing through a complete cycle of variation during the rotation of the rotor through one tooth pitch.

The inductor machine may be also made without the armature winding, that is only with one field winding. In this case a load in the single-phase generator mode or a supply voltage in the single-phase motor mode is connected between the zero points of the remaining winding and the exciter which are connected according to a star pattern.

The above-described machine possesses a number of substantial advantages as compared to prior art inductor machines.

Due to the above-mentioned ratio between numbers of teeth it is provided, as is known, a variation of magnetic conductance of the teeth groups encompassed by the distributed windings, which is very close to the sinusoidal variation. This characteristic is very important, where the machine is used as sensor in a follow-up system as mentioned above, since this permits to increase the accuracy of the sensor. Due to the use of the distributed field winding in combination with said sinusoidal variation of magnetic conductance, a substantially sinusoidal waveform of the output voltage in the generator mode is obtained, as well as high uniformity of the rotational speed in the motor mode.

The use of the machine in the motor mode permits to obtain a low-speed motor with accurate control of the rotational speed with the supply from normal frequency mains, or to use the supply from high or medium frequency supply source. The supply of the field winding with the current at a slip frequency which is proportional to a deviation of the rotor speed from the synchronous one, permits to attain accurate stabilization of the rotational speed in the motor mode or the output voltage frequency in the generator mode.

The embodiment of the machine shown in FIGS. 1 and 2 also possesses a number of advantages. The construction of the magnetic circuit ensures minimum consumption of an electrical-grade steel and weight reduction which is important in applications in automatic control systems. The manufacturing of this magnetic circuit does not require the use of intricate dies. Furthermore, in this construction an electrical grade laminations of a very small thickness may be employed, resulting in considerable reduction of losses at high frequencies.

The annular armature winding is very simple to manufacture and has minimum dispersion resistance, while its arrangement separately relative to other windings facilitates the application of insulation.

I claim:

1. An inductor machine having a shaft and comprising in combination, a stator having a plurality of teeth and three multiphase windings; a rotor having teeth which are uniformly distributed along its circumference, said stator and rotor having magnetic structure means which define a number of repeatable sections of said machine, each repeatable section having the same relative arrangement of said stator and rotor teeth, while a path of maximum magnetic conductivity moves along the entire length of each repeatable section as the rotor turns by one tooth division; one of said three multiphase windings having a predetermined number of pole pairs; another one of said three multiphase windings having a number of pole pairs which is equal to the number of pole pairs of said one of said three multiphase windings plus the number of said repeatable sections; the third one of said three multiphase windings having a number of pole pairs which is equal to the number of pole pairs of said one of said three multiphase windings minus the number of said repeatable sections.

2. An inductor machine according to claim 1, wherein the ratio between the greatest number of pole pairs of one of said three multiphase windings and the smallest number of pole pairs of one of said three multiphase windings is equal to an integer.

3. An inductor machine having a shaft and comprising, in combination, a stator having a plurality of teeth and two multiphase windings and one single-phase winding; a rotor having teeth which are uniformly distributed along its circumference; said stator and rotor having magnetic structure means which define a number of repeatable sections of said machine, each repeatable section having the same relative arrangement of said stator and rotor teeth, while a path of maximum magnetic conductivity moves along the entire length of each repeatable section as the rotor turns by one tooth division; one of said two multiphase windings having a number of pole pairs equal to the number of said repeatable sections, while the other one of said two multiphase windings has twice the number of pole pairs of said one of said two multiphase windings.

4. An inductor machine according to claim 1 wherein said magnetic structure means comprise bars of magnetic material laminated in layers and arranged along the shaft of the machine.

5. An inductor machine according to claim 3 wherein said magnetic structure means comprise bars of magnetic material laminated in layers and arranged along the shaft of the machine.

6. An inductor type machine according to claim 3 wherein said single-phase winding comprises an annular coil coaxial with the shaft of the machine.

* * * * *